US012015631B2

(12) United States Patent
Morgan

(10) Patent No.: US 12,015,631 B2
(45) Date of Patent: Jun. 18, 2024

(54) DIAGNOSING AND MANAGING NETWORK VULNERABILITIES

(71) Applicant: DeepSurface Security, Inc., Lake Oswego, OR (US)

(72) Inventor: Timothy Daniel Morgan, Portland, OR (US)

(73) Assignee: DEEPSURFACE SECURITY, INC., Lake Oswego, OR (US)

(*) Notice: Subject to any disclaimer, the term of this patent is extended or adjusted under 35 U.S.C. 154(b) by 497 days.

(21) Appl. No.: 17/217,714

(22) Filed: Mar. 30, 2021

(65) Prior Publication Data

US 2022/0191230 A1 Jun. 16, 2022

Related U.S. Application Data

(60) Provisional application No. 63/124,610, filed on Dec. 11, 2020.

(51) Int. Cl.
*H04L 9/40* (2022.01)
(52) U.S. Cl.
CPC ...... *H04L 63/1433* (2013.01); *H04L 63/1416* (2013.01); *H04L 63/1425* (2013.01); *H04L 63/1466* (2013.01); *H04L 63/20* (2013.01)
(58) Field of Classification Search
CPC ............. H04L 63/1433; H04L 63/1416; H04L 63/1425; H04L 63/1466; H04L 63/20
USPC ......................................... 726/25, 22, 23, 24
See application file for complete search history.

(56) References Cited

U.S. PATENT DOCUMENTS

| 10,320,827 | B2* | 6/2019 | Crabtree | H04L 63/1433 |
|---|---|---|---|---|
| 10,425,437 | B1* | 9/2019 | Bog | H04L 63/1408 |
| 2007/0226796 | A1* | 9/2007 | Gilbert | G06F 21/577 |
| | | | | 726/25 |
| 2017/0286690 | A1* | 10/2017 | Chari | G06F 21/577 |

(Continued)

FOREIGN PATENT DOCUMENTS

EP 3664410 B1 8/2023

OTHER PUBLICATIONS

"International Search Report and Written Opinion issued in PCT Application No. PCT/US21/062903", Mail Date: Mar. 17, 2022, 4 pages.

(Continued)

*Primary Examiner* — Teshome Hailu
(74) *Attorney, Agent, or Firm* — Ray Quinney & Nebeker; James Bullough

(57) ABSTRACT

The present disclosure generally relates to systems, methods, and computer-readable media for identifying instances of vulnerabilities on a computing network and generating a graph representing pathways that an attacking entity may take with respect to accessing one or more sensitive assets. For example, one or more systems disclosed herein collect network information and vulnerability information to generate a graph including nodes and edges representing at least a portion of the computing network associated with different vulnerabilities. The systems described herein may use graph theory to generate or otherwise identify pathways that an attacker is likely to use in accessing the sensitive asset(s). The systems additionally may further evaluate the pathways and associated likelihoods/risks to intelligently select one or more action items associated with a reduction of risk to the networking system.

20 Claims, 8 Drawing Sheets

(56) References Cited

U.S. PATENT DOCUMENTS

2017/0289187 A1\* 10/2017 Noel .................. G06F 16/9024
2020/0099704 A1\* 3/2020 Lee ..................... H04L 63/1466

OTHER PUBLICATIONS

George Gemini et al.: "Vulnerability-based risk assessment and mitigation strategies for edge devices in the Internet of Things", Pervasive and Mobile Computing, Elsevier, NL, vol. 59, Aug. 6, 2019.

Lamichhane Prabin B et al.: "A Quantitative Risk Analysis Model and Simulation Of Enterprise Networks", 2018 IEEE 9TH Annual Information Technology, Electronics and Mobile Communication Conference (IEMCON), IEEE, Nov. 1, 2018, pp. 844-850.

\* cited by examiner

DIAGNOSING AND MANAGING NETWORK VULNERABILITIES

BACKGROUND

Recent years have seen significant growth in the use of computer networks. Indeed, it is now common for individuals and businesses to make use of computer networks having hundreds and thousands of machines. These computer networks may be used for a variety of purposes including communication between users, data storage, and any number of applications. As the size and complexity of computer networks continues to grow, increasing quantities of information, including sensitive information, can be at risk. This becomes increasingly apparent as the number of security threats continues to grow with respect to unauthorized entities gaining access to information maintained on computer networks.

DETAILED DESCRIPTION

Figure 1:
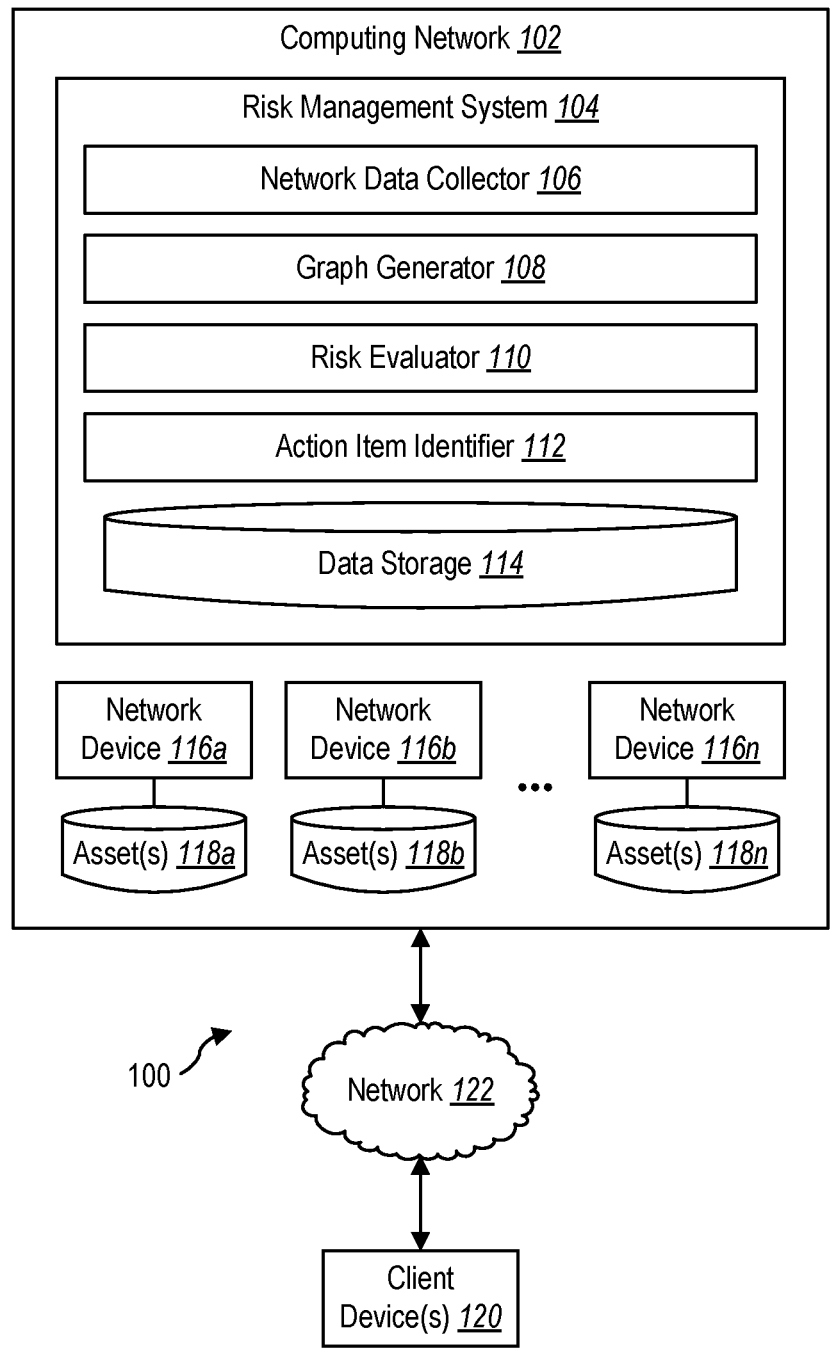
FIG. 1 illustrates an example environment of a computing network including a risk management system implemented thereon in accordance with one or more embodiments.

The present disclosure generally relates to a risk management system for identifying network vulnerabilities (or simply "vulnerabilities") on a computing network (e.g., a local network, private network, public network, cloud computing network) and determining levels of risk associated with respective instances of the vulnerabilities (e.g., escalations). For example, and as will be discussed in further detail below, upon collecting network data about a computing network, the risk management system can generate a network graph including a plurality of nodes (e.g., access levels), node edges, and network pathways that define processing or communication paths between an attacking entity and an asset (e.g., a sensitive asset) on the computing network.

As an illustrative example, in one or more embodiments, a risk management system may receive network information associated with a computing network including asset data, network architecture data, access rights data, and application configuration data. The risk management system may additionally receive or otherwise identify a plurality of vulnerability instances for the computing network. In one or more embodiments, the risk management system may generate a threat graph for the computing network based on the network information and vulnerability instances. The threat graph may include a plurality of pathways between an attacking entity (or multiple attacking entities) and one or more sensitive assets where each pathway includes one or more edges connecting access nodes of the computing network. The risk management system may additionally determine pathway risks based on likelihoods for the respective and an impact associated with the sensitive asset(s). The risk management system can additionally identify one or more action items to perform on the computing network to reduce risk to the computing network from the identified vulnerabilities.

Many conventional systems attempt to improve network security by installing patches, implementing policies, and a wide variety of techniques for reducing a number of security issues that may exist on a variety of computer networks. Understanding where and how to implement these security improvements, however, can become complicated, particularly where a computer network may have hundreds or thousands of vulnerable points that need to be addressed. Moreover, many conventional security improvements can be detrimental to reliability and performance of existing computer software and systems. As a result, conventional network security systems suffer from a number of problems and drawbacks.

For example, while conventional vulnerability scanners may be used to identify any number of security issues, these vulnerability scanners often fail to identify security issues that are the most important with respect to a computer network as a whole. For example, conventional vulnerability scanners may provide a list of known vulnerabilities to direct network security personnel to fix. Simply identifying known vulnerabilities, however, has limited use in most computing networks. For example, not all known vulnerabilities are necessarily important to fix or provide a significant boost to security of a network system. In addition, where a conventional vulnerability scanner may often indicate thousands of potential security threats, administrators of a computer network may simply have limited manpower to address the massive number of potential security issues. As a result, maintaining a secure computer network can become an overwhelming and expensive task for businesses and individuals that have a high interest in securing sensitive network assets.

These and other problems exist in connection with improving network security for a computer network, many of which are discussed in further detail below in connection with example implementations of the risk management system.

As will be discussed in further detail below, the present disclosure includes a number of practical applications having features described herein that provide benefits and/or solve problems associated with diagnosing network risks and improving network security in a computing environment. Some example benefits are discussed herein in connection with features and functionalities provided by a risk management system. Nevertheless, it will be appreciated that benefits explicitly discussed in connection with one or more implementations herein are provided by way of example and are not intended to be an exhaustive list of all possible benefits of the risk management system.

For example, the risk management system provides features and functionality that facilitate selective identification of pathways that are likely to be exploited by a potential attacker. Indeed, rather than considering and performing full risk evaluation of all possible pathways, the risk management system generates a network graph based on identified vulnerabilities that correspond to associated likelihoods that a given edge will be used by an attacker to potentially gain access to a sensitive asset. In this way, the risk management system significantly reduces the amount of information that a security professional would need to navigate in determining potential security risks to the computing network. Moreover, by selectively identifying network pathways, the risk management system reduces the amount of processing needed to evaluate risk associated with respective paths and/or action items.

As another example, rather than simply identifying vulnerabilities associated with higher likelihood of attack or based on ease of access of specific pathways between respective nodes of a computing network, the risk management system can consider a combination of factors to determine a more comprehensive metric of risk to a system. For example, even where a specific vulnerability may be associated with a very high likelihood of attack when considered in isolation, the risk management system may nonetheless identify a vulnerability or pathway having a lower likelihood of attack as a much higher priority in lowering overall risk to the computing system. As will be discussed below, this determining of risk may be based on edges being associated with multiple pathways, certain pathways having a fewer number of edges, a higher metric of impact associated with a given sensitive asset, and other factors.

As illustrated in the foregoing discussion, the present disclosure utilizes a variety of terms to describe features and advantages of the risk management system. Additional detail will now be discussed regarding the meaning of some of these terms.

For example, as used herein, a "computing network" or "computer network" may refer to a network of connected computing devices that provide services and/or host applications thereon. For example, a computing network may refer to a distributed computing system including a collection of physical computing or server devices (e.g., network devices) that are interconnected with one another and which provide access to one or more assets thereon. The computing network may refer to a hierarchical structure including groups of devices, virtual networks, fault domains, or other groupings of devices. The computing network may include a variety of computing devices including client devices (e.g., mobile or non-mobile user devices), server devices, routers, switches, etc.

As used herein, a "vulnerability" may refer to any problem or issue that has been called out with respect to a piece of software or a configuration (e.g., a device configuration, an account configuration, an application configuration). As an example, a vulnerability may refer to a known problem that exists with respect to a particular browser or operating system. In one or more embodiments, a vulnerability refers to a common vulnerabilities and exposures record instance (referred to herein as a "CVE"). In one or more embodiments, a vulnerability refers to one of a collection of known vulnerabilities that have been discovered over time by a community of users. In one or more embodiments, a vulnerability refers to any vulnerability from a library of vulnerabilities accessible to a vulnerability scanner (e.g., an application configured to scan for vulnerabilities on a computing network). In one or more embodiments, vulnerabilities may refer to issues that are specific to a particular computing network, such as vulnerabilities that are identified or discovered by pentesters or domain experts for the computing network.

As used herein, an "escalation" may refer to a specific instance of a vulnerability, the access granted explicitly by a system configuration at a specific location in the network, or the implicit access an entity would have due to the inherent design of a system at a specific location in the network. For example, where multiple edges of a graph may be associated with the same vulnerability, each instance of the vulnerability may be referred to as an escalation. As a further example, where a single edge is associated with multiple vulnerabilities, each of the vulnerabilities may be referred to as an escalation associated with the corresponding edge. In one or more embodiments, an escalation represents how a specific user account has been added to a specific access control group on a specific software system installation. In one or more embodiments, an escalation represents how an employee has physical access to a computing device in the case where they have badge access to the room in which it is housed.

As used herein, a "threat graph" or "graph" may be referred to as a representation of nodes and edges for a given computing network. As will be discussed in further detail below, a graph may include a collection of nodes and edges that are interconnected and define pathways through which data may be processed or communicated and through which assets (e.g., sensitive assets) may be accessed by an attacking entity.

As used herein, a "node" or "access node" may refer to a level of access or privilege with respect to one or more assets on a computing network. As an example, a node may refer to a user account, group account, or other type of account associated with a corresponding level of access to asset(s) on a computing network. As another example, a node may refer to an administrative node or an administrator account having high or fully privileged access to other nodes within a graph. As another example, a node may refer to distinct levels of access on a TCP/IP network, as dictated by subnet locality and associated firewall rules. In one or more embodiments, a computing device may be associated with multiple nodes, such as where multiple user accounts are accessed using a single network device.

As noted above, a graph may have a framework including nodes and edges. As used herein, an "edge" or "node edge" may refer to a path or connection between two nodes. A node may include any number of edges extending between the node and one or more additional nodes of a graph. For example, an administrator node that is fully connected may include edges connecting the administrator node to all or almost all nodes within a graph. Alternatively, a less privileged user account may only include a few edges or a single edge based on a level of access the node has on the computing network. While one or more implementations may refer to any edge between any node of a network, in one or more embodiments described herein, an edge may refer exclusively to connection between nodes that are associated with a corresponding vulnerability. Thus, in one or more embodiments described herein a graph may only include edges that are associated with at least one instance of a vulnerability.

As used herein, a "pathway" or "network pathway" may refer to one or multiple edges connecting a given node or entry point with an asset on the computing network. For example, in one or more embodiments described herein, a pathway may refer to multiple edges that connect an attacking entity or other external computing device with an asset implemented within the computing network. A pathway may include any number of edges. For example, where a node is fully privileged, a pathway may refer to a single edge connecting the node to an asset. Alternatively, where multiple hops are involved in routing a first node to an asset, the pathway may include the multiple edges connecting the first node to the asset.

As used herein, a "sensitive asset" may refer to any asset on a computing network that has been indicated or otherwise identified as sensitive or impactful if accessed by a non-authorized entity. As used herein, an "asset" may refer to any data that is stored or otherwise maintained within the computing network. Examples of assets include files, folders, virtual machines, devices, databases, application, service, account data, or any data object (or set of multiple data objects) that can be accessed via the computing network. In one or more embodiments described herein, files or databases are referred to as sensitive assets (Though any type of asset may be indicated as sensitive). Alternatively, services, such as virtual machines, containers, or any application having access to important or impactful data may be considered a sensitive asset. In one or more embodiments, a sensitive asset may simply refer to any service or database that has a high priority or low tolerance for failure, such as a service that is indicated as never going down (and which may go down in the event of an attack).

As used herein, an "action item" or "security action item" may refer to any action that may be performed on the computing network to remove or otherwise address one or more instances of vulnerabilities (e.g., escalations) from the computing network. For example, an action item may refer to a patch or update that may be added to a device, asset, or node to comply with a certain standard and/or otherwise remove one or more escalations. As another example, an action item may refer to a policy or standard that should be maintained or implemented on a particular machine, device, or node that would similarly remove one or more escalations from the computing network. In one or more embodiments, an action item refers to a specific action, policy, or other item from a collection of predefined actions that may be performed with respect to the computing network. For example, a collection of predefined action items may include action items such as removing all escalations for a corresponding vulnerability, removing some or all escalations for an associated edge, applying a patch (e.g., a software patch) to a device or application associated with a vulnerability, and removing some or all vulnerabilities for a particular device.

Additional detail will now be provided regarding the risk management system in relation to illustrative figures portraying example implementations. For example, FIG. 1 illustrates an example environment 100 including a risk management system 104 having features and functionality for identifying instances of vulnerabilities (e.g., escalations), determining risks associated with network pathways, and determining action items to perform on a computing network to optimize actions that will substantially reduce risk on a computing network.

As shown in FIG. 1, an example environment 100 includes a computing network 102 having a risk management system 104 implemented thereon. As shown in FIG. 1, the risk management system 104 may include a network data collector 106, a graph generator 108, a risk evaluator 110, and action item identifier 112. The risk management system 104 may additionally include a data storage 114. Some or all of the components 106-114 of the risk management system 104 may be implemented on a computing device (e.g., a server device, network device) as part of a single service or application. Alternatively, some or all of the components 106-114 of the risk management system 104 may be implemented as part of different services and/or applications on a single or across multiple computing devices.

As shown in FIG. 1, the computing network 102 may include any number of network devices 116a-n. One or more of the network devices 116a-n may be connected to or have access to one or multiple assets 118a-n. The network devices 116a-n may have one or more nodes thereon that are connected to other nodes on the same or on different network devices via corresponding edges. As will be discussed in further detail below, the nodes and edges on the network devices 116a-n may define a graph (e.g., a threat graph) that includes pathways between an attacking entity and one or more sensitive assets (e.g., assets 118a-n).

As shown in FIG. 1, the environment 100 includes client device(s) 120, which may refer to an attacking entity or any device capable of interacting with one or more network devices 116a-n from outside the computing network 102. As further shown, the client device 120 and devices (e.g., network devices 116a-n) of the computing network 102 may communicate over a network 122. The client device(s) 120 may refer to any computing device associated with a user or having a vulnerability scanner thereon that is configured to interact with the computing network 102. The client device 120 may refer to a consumer electronic device including, by way of example, a mobile device, a desktop computer, or other type of computing device. Moreover, the network 122 may refer to one or multiple networks that use one or more communication protocols or technologies for transmitting data. For example, the network 122 may include the Internet or other data link that enables transport of data between devices of the computer network 102 and the client device 120. In addition, while not shown in FIG. 1, the computing network 102 may include one or more networks between network devices 116a-b that make up the computing network 102.

In addition, while FIG. 1 illustrates an example in which the risk management system 104 is implemented within the computing network 102, it will be understood that the risk management system 104 may similarly be implemented on a device from outside the computing network 102. For example, while one or more embodiments described herein refer to the client device 120 as an attacking entity, in one or more embodiments, some portion or all of the risk management system 104 is implemented on the client device 120 as a tool for creating the risk graph and performing one or more acts described in connection with components of the risk management system 104. In addition, while not shown in FIG. 1, the environment 100 may include multiple devices from without the computing network 102, such as a first client device having the risk management system thereon and another client device that acts as or may be referred to as an attacking entity.

It will be appreciated that the components 106-114 of the risk management system 104 may include hardware, software, or a combination of both. For example, the components 106-114 of the risk management system 104 may include instructions stored on a computer-readable storage medium and executable by processors of one or more computing device. When executed by the one or more processors, the computer-executable instructions of one or more computing devices (e.g., client device, network devices) can perform one or more methods described herein. Alternatively, the components may include hardware, such as a special purpose processing device to perform a certain function or group of functions. Additionally, or alternatively, the components can include a combination of computer-executable instructions and hardware.

As mentioned above, the risk management system 104 may include a network data collector 106 for collecting various types of network information. For example, the network data collector 106 can collect different types of network information including sensitive asset information (e.g., customer indications of sensitive assets), knowledge of network architecture (e.g., device data, topology data, inter-device connection data), knowledge of system access rights (e.g., node data, permissions), and knowledge of application configurations (e.g., policies, application configurations, node configurations, device configurations).

In addition to information about the computing network 102, the network data collector 106 can additionally collect vulnerability data. For example, the network data collector 106 can receive an indication of any number of instances of known vulnerabilities from a vulnerability database. In one or more embodiments, the network data collector 106 receives or otherwise obtains the vulnerability data by running a vulnerability scan on the computing network 102.

As further mentioned, the risk management system 104 may include a graph generator 108. The graph generator 108 may construct a model or graph of the computing network 102 defined by nodes and edges and based on the identified vulnerabilities. For example, in one or more embodiments, the graph generator 108 generates a graph including a subset of nodes and edges present within the computing network 102 that are associated with identified vulnerabilities. Accordingly, the threat model or resulting graph may include a partial representation of nodes and edges that make up the total topology of the network architecture based on those nodes and edges being associated with corresponding vulnerabilities. In one or more embodiments, the graph may omit one or more edges and nodes that are not otherwise associated with one or more vulnerabilities, and would therefore not present a viable option for a potential attacking entity to gain access to one or more sensitive assets.

In one or more embodiments, the graph generator 108 may additionally identify probabilities or likelihoods associated with the respective vulnerabilities and applied to the edges of the graph. For example, in one or more embodiments, the graph generator 108 determines a likelihood for each edge of the graph based on a likelihood that an attacker will traverse the edge in the event of an attempted attack.

The graph generator 108 may determine the edge likelihoods in a number of ways. For example, in one or more embodiments, the graph generator 108 runs a number of attack simulations between nodes of the graph and calculates or otherwise determines a likelihood based on a rate of simulated successes. In one or more implementations, the graph generator 108 may receive likelihoods associated with different vulnerabilities based on determined likelihoods with respect to those vulnerabilities on other networks. In this case, some of the vulnerabilities may be associated with higher or lower probabilities which may be used to determine a corresponding edge likelihood.

In one or more embodiments, the edges of the graph may be associated with multiple escalations. For example, a first edge may include multiple escalations of different vulnerabilities. In this case, a likelihood for the first edge may be a function of likelihoods or probabilities associated with the multiple escalations. For instance, where each of two escalations are associated with 50% likelihoods of successful attack, a combined likelihood for the edge may be 75% (e.g., $1-(0.5)^2$), associated with a likelihood that either one of the two escalations may be exploited in traversing the edge to gain access to a sensitive asset.

Upon determining the likelihoods associated with the edges, the graph generator 108 may identify any number of pathways between an arbitrary point or node and the sensitive asset(s) (e.g., asset(s) 118a-n). For example, in one or more embodiments, the graph generator 108 identifies a plurality of paths between an attacking entity (e.g., client device(s) 120) and one or more identified sensitive assets. In one or more embodiments, the pathways are determined based on likelihoods of the edges that define the pathways between the point of origin (e.g., the attacking entity) and the sensitive assets.

As further shown in FIG. 1, the risk management system 104 includes a risk evaluator 110. The graph generator 108 and risk evaluator 110 can generate or otherwise identify the pathways in a number of ways. For example, in one or more embodiments, the graph generator 108 identifies a shortest path between an origin (e.g., an attacker) and a sensitive asset based on a number of hops along edges between the origin and the sensitive asset.

In one or more embodiments, the graph generator 108 utilizes graph theory to weight the edges based on associated likelihoods of attack to determine a most likely path between the origin and the sensitive asset. For example, the graph generator 108 may identify a pathway including a higher number of nodes and edges than other potential paths between the origin and the sensitive asset based on the identified pathway having a higher combined likelihood of attack than the other potential paths. In one or more embodiments, the risk evaluator 110 further evaluates and determines a measure of risk for the associated pathway, which the graph generator 108 may use in identifying the specific pathway.

As an illustrative example, the graph generator 108 and risk evaluator 110 may determine likelihoods associated with each of multiple potential pathways between an origin and a sensitive asset in determining and generating pathways. In particular, the risk evaluator 110 may combine individual likelihoods (e.g., based on combining probabilities of respective edges) to determine a likelihood that an attacker will traverse each of multiple edges in route to accessing a sensitive asset via the respective pathways. Thus, where a first pathway has two hops (two edges) between the origin and sensitive asset having low or very low associated likelihoods and a second pathway has four edges (or some number greater than two) with each of edges having a relatively high likelihood that, when combined, exceeds the combined likelihood of the first pathway, the graph generator 108 may identify the second pathway as the most likely pathway to the associated sensitive asset based on the likelihoods and associated risks.

In one or more embodiments, the graph generator 108 and risk evaluator 110 can identify a most likely pathway between each of one or more origins and each of one or more sensitive assets. Alternatively, the graph generator 108 may identify multiple pathways where one or more pathways exceed a threshold likelihood of attack that an individual or administrator of a computing network 102 would like to be aware of (e.g., as indicated by a policy or preference that drives the graph generator in identifying pathways). In one or more embodiments, the graph generator 108 may identify a predetermined number of pathways that are associated with higher likelihoods than other pathways. In one or more embodiments, the graph generator 108 may rank a set of possible pathways and identify a set of the most likely pathways for attack. In one or more embodiments, the graph generator 108 may identify any number of pathways having a likelihood above a threshold likelihood of attack.

In one or more embodiments, the graph generator 108 may identify pathways based on any combination of the above examples. As a non-limiting example, in one or more embodiments, the graph generator 108 may identify a predetermined number of paths for each of multiple sensitive assets (e.g., two, three pathways) that satisfy a threshold likelihood score. However, where one or more sensitive assets may not have an associated pathway that exceeds or otherwise satisfies the threshold likelihood, the graph generator 108 may identify at least one pathway having the highest likelihood of success for an attacker, even if below the threshold.

After identifying the pathways associated with corresponding likelihoods of attack, the risk management system 104 can further evaluate the graph, including the pathways and associated likelihoods (e.g., pathway likelihoods, edge likelihoods) as well as the indicated importance or impact of the respective assets to perform a risk analysis on the graph. In particular, as shown in FIG. 1, an action item identifier 112 may consider a combination of likelihoods and indicated importance or impact of the sensitive assets to come up with a plan or identify one or more action items that may be performed to lower risk on the computing network 102.

As an example, the risk evaluator 110 may implement a risk analysis model or risk algorithm in which a risk is determined for various components of the graph. For instance, the risk evaluator 110 may determine a risk associated with each pathway. As will be discussed in further detail below, the risk analysis model include a function of multiple factors including likelihoods of the respective edges and an impact of the assets corresponding to the respective pathways. The risk evaluator 110 may similarly determine risk scores associated with each edge, each vulnerability, each escalation, or other components that make up or otherwise influence the makeup of the graph. In one or more embodiments, the risk evaluator 110 may determine a composite or total risk to the computing network 102 based on a combination of risk metrics for the plurality of pathways.

As mentioned above, and as shown in FIG. 1, the risk management system 104 may include an action item identifier 112. In one or more embodiments, the action item identifier 112 may consider the determined risks for each of the pathways and other subcomponents of the graph to determine one or more actions to perform with respect to removing escalations and/or vulnerabilities from the computing network and reducing a risk to the system and/or to the sensitive assets. For example, the action item identifier 112 may determine one or more actions to perform based on a total risk reduction to the computing system 102.

To illustrate, the action item identifier 112 may simulate or evaluate a reduction of risk to the computing network 102 based on one more actions being performed on the computing network 102 that would result in one or more escalations being removed from the graph. For instance, the action item identifier 112 may perform any number of iterations of various actions and compare a total system risk (e.g., a sum of pathways risks) prior to removing the escalation(s) and an updated total system risk after removing the escalations. The action item identifier 112 may perform any number of permutations to determine which action would result in a bigger reduction of risk than any other action that is simulated with respect to the graph.

As noted above, and as will be discussed in further detail below in connection with FIGS. 3A-3C, the risk to the system may be a function of edge likelihoods and associated asset importance (e.g., impact). In one or more embodiments, the risk is evaluated for each pathway identified by the graph generator 108. Accordingly, certain assets designated with higher importance or impact may result in certain pathways being associated with higher risk values even where those pathways may have combinations of edges having a higher traversal likelihood. Moreover, where certain pathways may have edges that intersect with other pathways, multiple asset impacts may factor into the calculation of risk for one or multiple respective pathways.

In identifying particular action items to facilitate reduction of network risk, the action item identifier can choose from among a collection of known action items associated with different vulnerabilities. For example, where certain vulnerabilities are known to be removable by performing a corresponding action (e.g., updating a policy or setting, applying a patch), the corresponding action(s) may be included within a listing of predetermined actions that may be performed to remove any of a plurality of vulnerabilities identified for the graph. The predetermined actions may also include a number of applicable actions to be performed with respect to specific nodes, devices, or other subcomponent of the computing network 102.

As just mentioned, a collection of predetermined actions may include actions known to remove specific instances of vulnerabilities. In addition, the predetermined actions may include actions applicable to specific devices, applications, nodes, etc. including, but not limited to removing all instances of a vulnerability, removing some or all vulnerabilities from an associated edge, applying a software patch to each of one or multiple devices that are known to be associated with a specific vulnerability, removing some or all vulnerabilities associated with a particular device.

In one or more embodiments, the risk management system 104 may evaluate comparisons in risk between the computing network 102 before and after performance of the respective action items. In one or more embodiments, the risk management system 104 may perform (or otherwise cause to perform) any discrete action item or combination of related action items to determine which of the action item(s) would result in the largest overall risk reduction to the networking system. In one or more embodiments, the action item identifier 112 may identify a plurality of action items and organize the action items by rank within a listing of potential action items to the computing network 102.

The action item identifier 112 may additionally provide a listing of potential action items to be performed based on the determined risk reductions. For example, the action item identifier 112 may identify a predetermined number of action items corresponding to the highest risk reduction and provide indicators of the action items to a security professional or administrator of the computing network. As another example, the action item identifier 112 may provide a listing of ranked action items indicating which of the action items from a total listing of action items are associated with a largest risk reduction.

As will be discussed below, the resulting listing of action items may be significantly different than conventional systems as a result of the simulation of total risk reduction. For example, where conventional vulnerability systems may provide a report listing known vulnerabilities and associated levels of likelihood (e.g., low, medium, high, critical) that the respective vulnerabilities may be used to traverse between access levels within a computer system, these likelihoods are not necessarily indicative of a risk to the networking system 102. For example, where a particular edge has an escalation associated with a "critical" level of likelihood, the edge may not pose any risk to the system because the edge is part of a longer pathway of other edges that have very high levels of security. Moreover, even where a particular edge contributed to a higher likelihood of infiltration for a particular asset, the sensitive asset may be associated with a significantly lower level of risk than another sensitive asset that is connected via an edge that has a medium or high level of risk and would therefore have a higher associated total risk.

As a further example, a specific edge having a medium or low likelihood of traversal may nonetheless represent a higher overall risk than a high or critical edge where the low or medium edge is part of multiple pathways and therefore associated with multiple sensitive assets or multiple paths to a single sensitive asset. In this case, the overall risk to the system may be significantly reduced relative to fixing the edge having a high or critical status as a result of the additional risk added by factoring the multiple sensitive assets applicable to the low or medium edge. Each of these examples represent material improvements to conventional network security systems that are often limited to diagnosing vulnerabilities to a network based on likelihood of infiltration of the particular vulnerabilities.

It will be understood that the risk management system 104 may perform the features and functionalities discussed herein any number of times with respect to a computing network 102 over time. For example, the risk management system 104 may perform the tasks of generating the graph and evaluating pathways to identify risk-reducing action items periodically (e.g., daily, weekly) and may significantly reduce the total risk to a computing network 102 over time. Moreover, by implementing the risk management system 104 in this manner, the risk management system 104 will quickly and efficiently find new vulnerabilities as they surface and pose a risk to the computing network 102. This provides up-to-date information that reduces risk on the computing network 102 with very little security diagnosis from network domain experts. Further, this enables security personnel to quickly identify new vulnerabilities as they are identified by the risk management system 104 and/or by the network security community.

Figure 2:
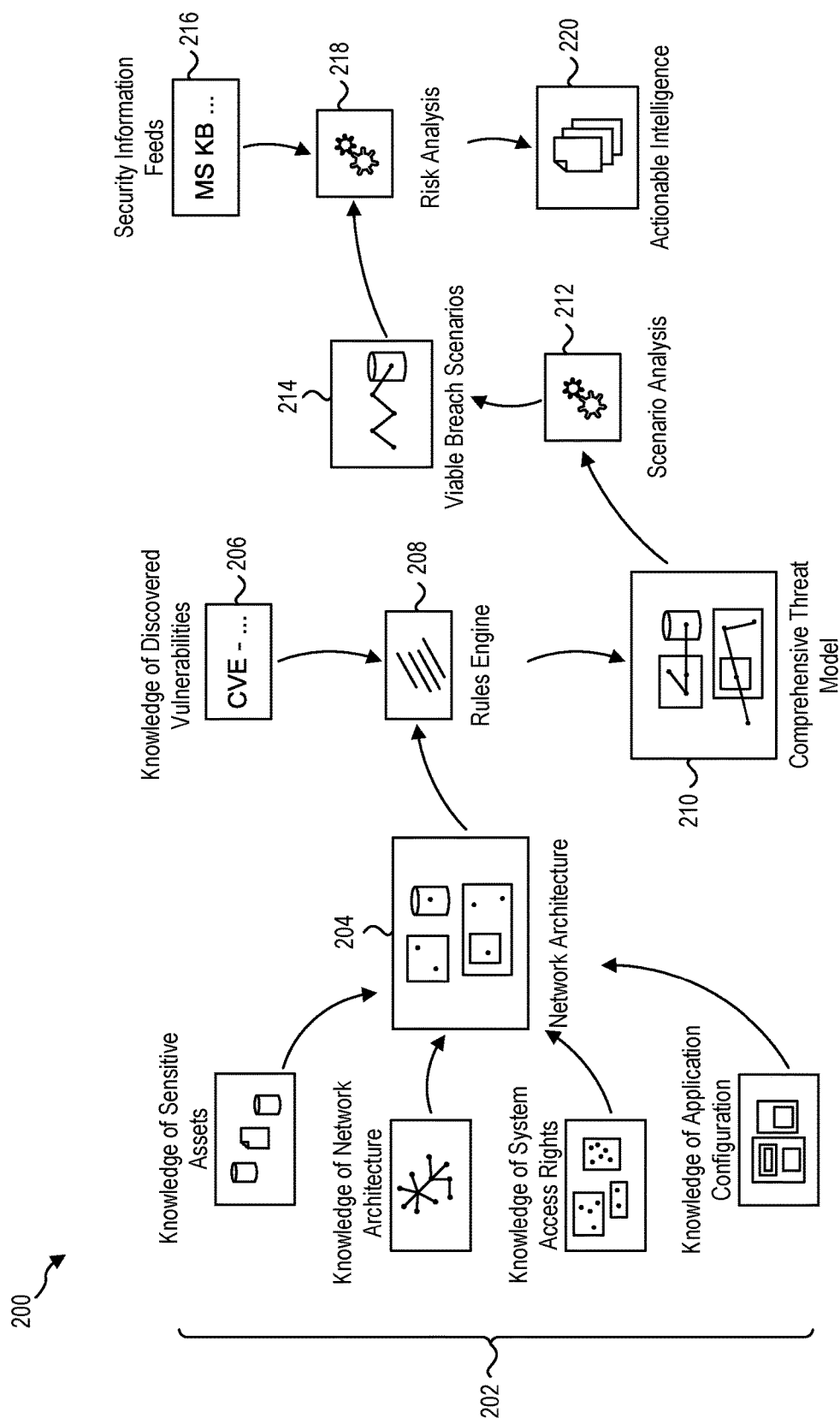
FIG. 2 illustrates an example workflow showing an example implementation in which a risk management system identifies action items for reducing risk on a computing network.

Additional detail will now be discussed in connection with FIG. 2. FIG. 2 illustrates a workflow 200 including features discussed above in connection with FIG. 1. For example, as shown in FIG. 2, the risk management system may receive network information 202 including knowledge of sensitive assets, knowledge of network architecture, knowledge of system access rights, and knowledge of application configuration (as well as any other information that may be used to generate a graph).

The risk management system 104 may model the network architecture 204 including any number of nodes as contained within the respective devices of the computing network 102. As shown in FIG. 2, some of the devices may include multiple nodes thereon. Other devices may include subcomponents (e.g., sub-devices, applications) having respective nodes thereon. Other nodes may originate from outside the devices of the computing network 102 (e.g., an entry point or an external node).

As further shown, the risk management system 104 may receive knowledge of discovered vulnerabilities 206. As indicated above, the knowledge of discovered vulnerabilities 206 may include a listing of CVEs that are applicable to the computing network 102. In one or more embodiments, the CVEs are discovered by applying a vulnerability scanned (e.g., a conventional or off-the-shelf vulnerability scanner) that scans the network architecture 204 to discover the presence of any number of vulnerabilities thereon. This may include out of date software, vulnerable application policies, and any other network information that represents a known vulnerability. The risk management system 104 may additionally consider historical usage information by users and/or nodes of the computing network 102.

The risk management system 104 (e.g., a rules engine 208) may generate a comprehensive threat model 210 including nodes and edges associated with the identified vulnerabilities. In particular, the risk management system 104 may generate or model a graph including edges associated with at least one escalation and which represents a potential likelihood that one or more sensitive assets can be accessed by an attacking entity.

The risk management system 104 may apply an analysis (e.g., a scenario analysis 212) to the graph to determine a number of viable pathways (e.g., viable breach scenarios 214) between potential attacking entities and the sensitive assets. While one or more embodiments described herein relate to an attacking entity, an attacking entity may refer to any point of origin of a potential attack. This may refer to an external device or attack point or an attack point from within the computing network 102. In any of the above examples, the risk management system 104 can discover one or more pathways or breach scenarios 214 between a point of attack and each of multiple sensitive assets.

In one or more embodiments, the risk management system can receive security information feeds 216 and information about the graph (e.g., pathway likelihoods and asset impacts) to determine actionable intelligence 220 to lower risk on the graph. For example, the risk management system 104 can apply a risk analysis 218 to determine which of a number of action items will result in more overall risk reduction to the networking system than other potential action items. The risk management system 104 may run any number of simulations and iterations to determine the associated risk reductions.

Figure 3A:
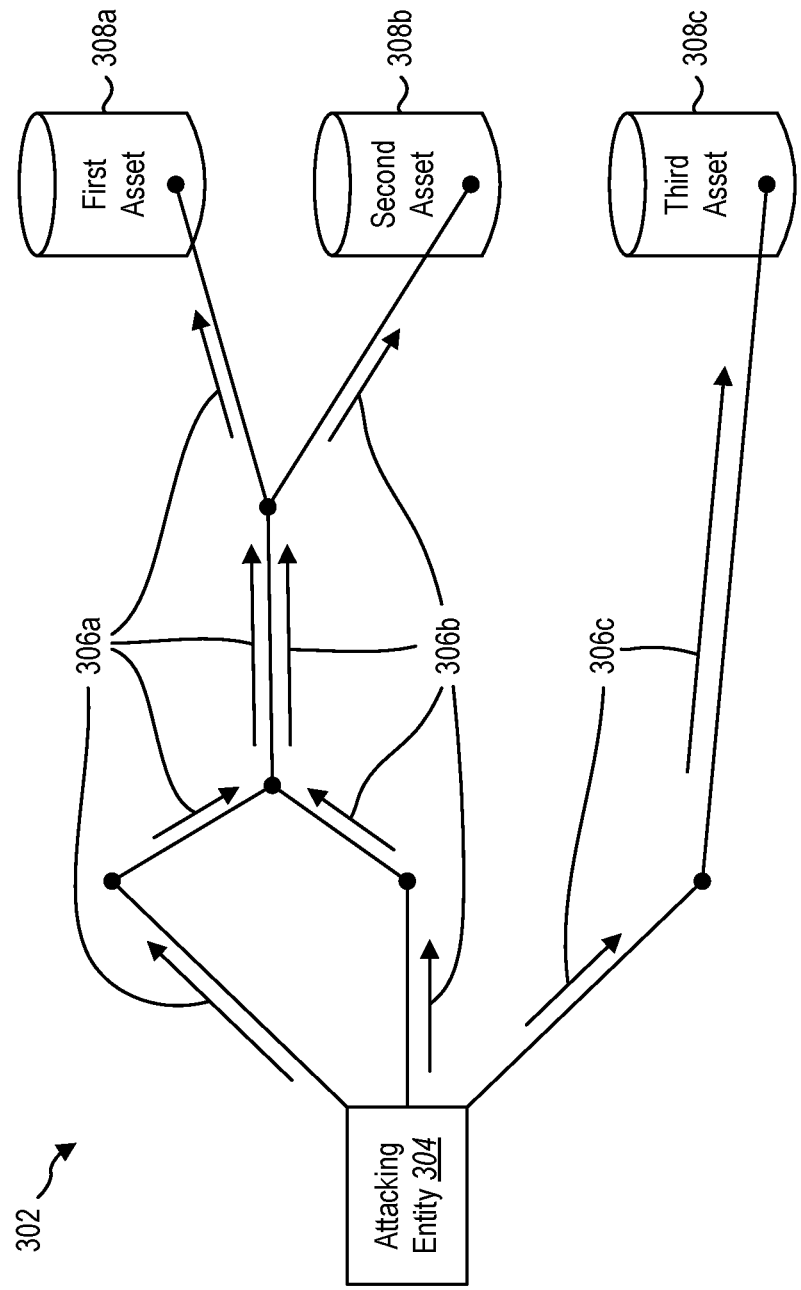
FIG. 3A shows an example network graph showing a plurality of pathways between an attacking entity and a plurality of network assets.

Moving on, FIG. 3A illustrates a simplified graph 302 showing three pathways 306*a-c* between an attacking entity 304 and three assets (e.g., first asset 308*a*, second asset 308*b*, third asset 308*c*). In particular, the example graph 302 shows a first pathway 306*a* (Pathway A) between the attacking entity 304 and the first asset 308*a* including a chain of four edges that traverse a corresponding set of nodes. The example graph also shows a second pathway 306*b* (Pathway B) between the attacking entity 304 and the second asset 308*b* including a chain of four edges passing between the attacking entity 304 and the corresponding set of nodes. The example graph 302 also shows a third pathway 306*c* (pathway C) between the attacking entity and the third asset 308*c* including a chain of two edges passing between the corresponding set of nodes. While FIG. 3A illustrates an example graph 302 showing a single attacking entity 304 and single paths to the respective assets 308*a-c*, the graph 302 may include multiple attacking entities as well as multiple pathways to each of any number of corresponding sensitive assets.

In addition, as shown in FIG. 3A, one or more of the edges for a first pathway 306*a* may also be a part of a second pathway 306*b*. For example, in the illustrated graph shown in FIG. 3A, the third edge for the first pathway 306*a* is the same as the third edge for the second pathway 306b. In addition, it will be noted that the third pathway 306c has fewer edges than either of the first or second pathways 306a-b. In addition, each of the assets 308a-c may have different levels of impact or risk associated therewith, as discussed above, and as will be discussed in further detail below.

As noted above, each of the edges within the example graph may have an associated one or more escalations. For example, FIG. 3B shows a number of escalations associated with various vulnerabilities 310a-h associated with each of the edges. Moreover, as indicated above, one or more escalations may refer to different instances of the same vulnerability that may be applicable to different nodes and/or edges of the graph. For example, a first vulnerability 310a (CVE-A) is associated with each first edge of the first pathway, second pathway, and third pathway.

Figure 3B:
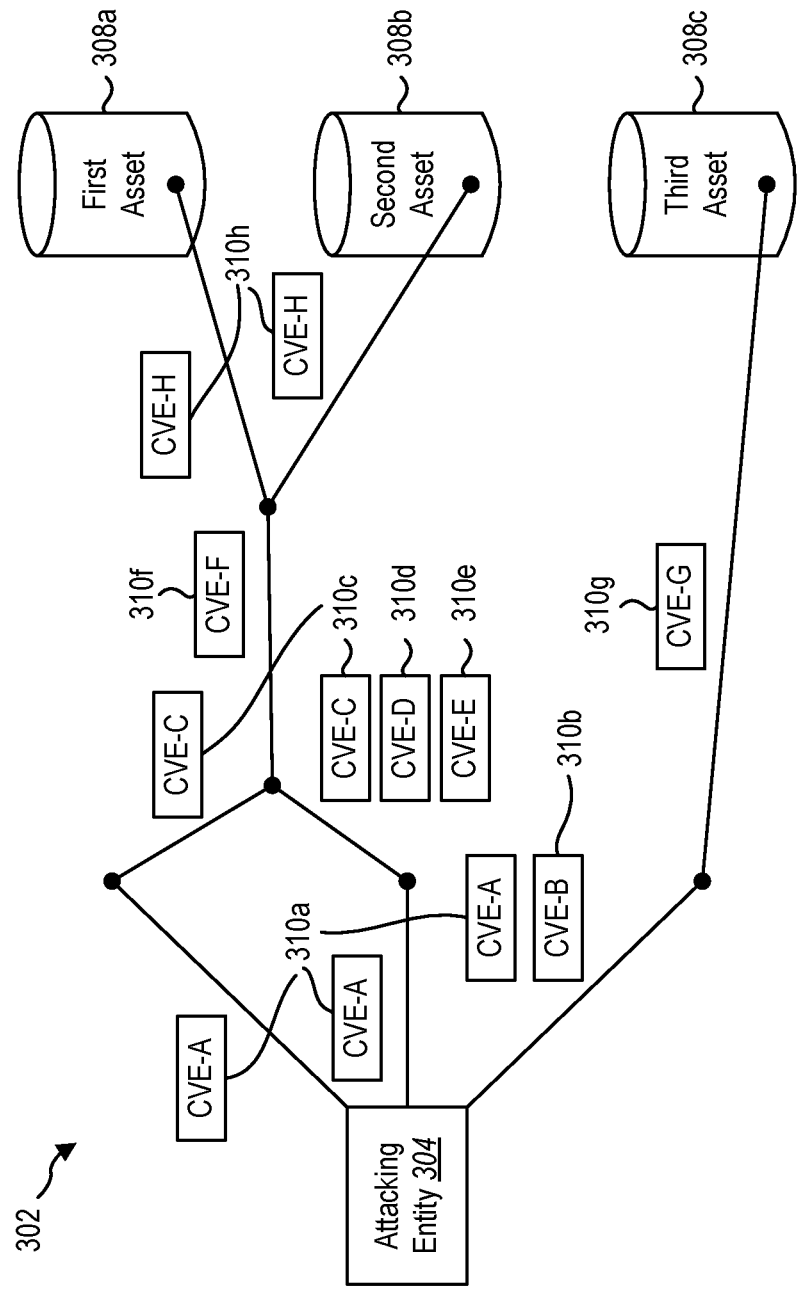
FIG. 3B shows an example network graph showing edges and associated vulnerabilities for the pathways shown in FIG. 3A.
Figure 3C:
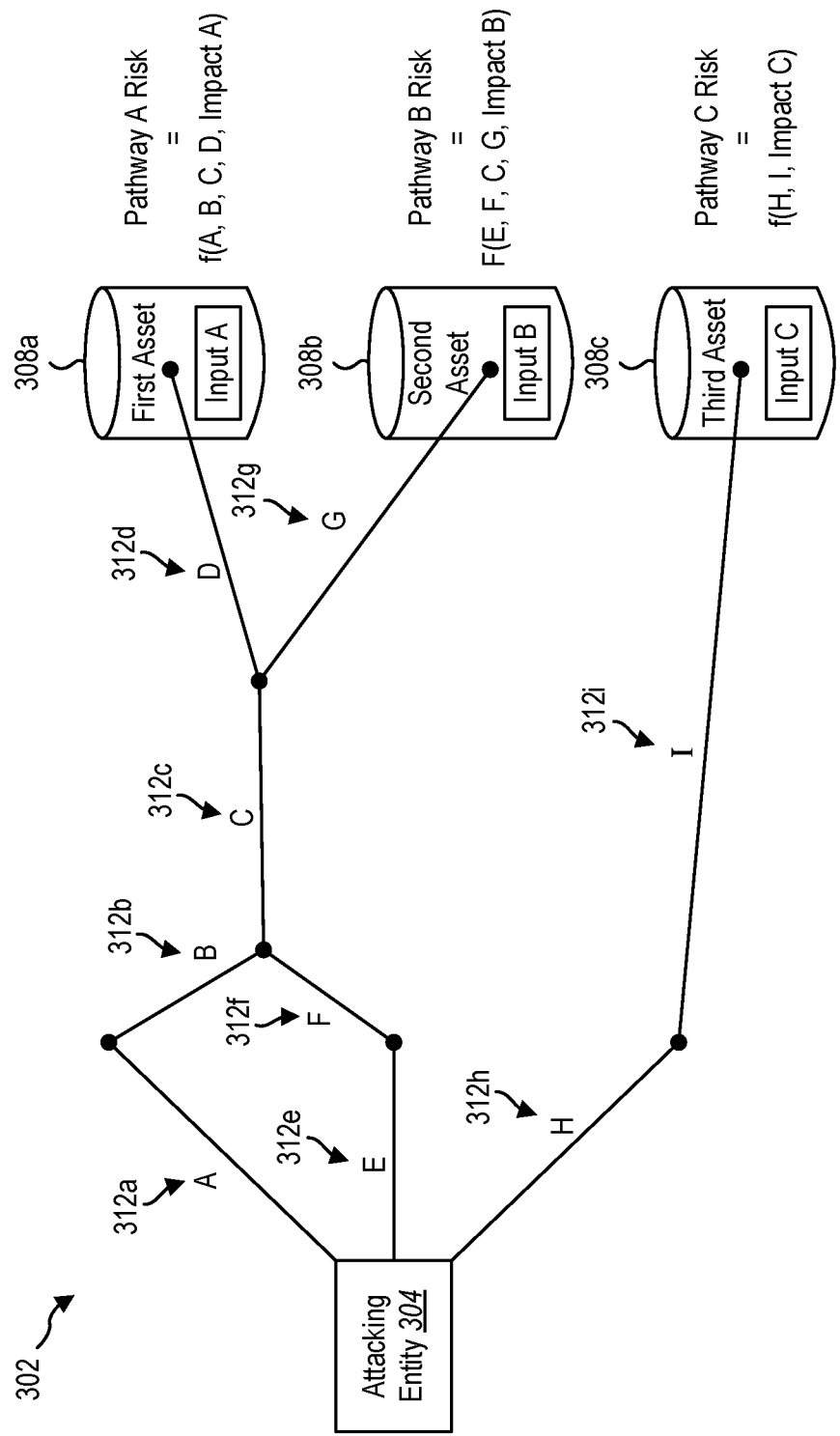
FIG. 3C shows an example network graph showing likelihoods and associated risks for the plurality of pathways shown in FIG. 3A.

Also shown in FIG. 3B, while each of the edges may be associated with at least one escalation, one or more of the edges may be associated with multiple escalations. For example, a second edge of the second pathway may be associated with three escalations (associated with vulnerabilities 310c-e) while the first edge of the third pathway may be associated with two escalations (associated with vulnerabilities 310a-b). Consistent with one or more embodiments described above, each of the escalations may contribute to a likelihood that a given edge can be attacked by the attacking entity. For example, the likelihood for an edge may be based on a combination of likelihoods associated with each of the respective escalations applicable to the edge.

As indicated above, each of the edges may have an associated likelihood based on any number of escalations associated with the edge. As shown in FIG. 3C, each of the edges may have a likelihood metric 312a-i (denoted as likelihoods A-I) based on likelihoods of the respective vulnerabilities (e.g., escalations of the vulnerabilities). As further shown, each of the assets may include an associated impact (Impacts A-C) associated with a value ranking from high importance to low importance. The impact values may be any value, and risk values may be effectively priorities for specific pathways by labeling corresponding assets as very important relative to the other sensitive assets.

In accordance with one or more embodiments described herein, risks may be determined for each of the respective pathways. In this example, the pathway risk may be determined based on a function of the edge likelihoods for the given pathway and any of the impact scores associated with the specific pathways. For example, a first pathway risk may be a function of likelihoods A, B, C, and D and Impact A. As further shown, a second pathway risk may be a function of likelihoods E, F, C, and G and Impact B. As further shown, a third pathway risk may be a function of likelihoods H, I, and Impact C.

It will be noted that one or more edges may be shared between different pathways and which may affect risk values for multiple pathways. For example, edge C is a part of both the first pathway and the second pathway. Accordingly, an action item that removes escalations from edge C would result in a reduction of pathway risks for both the first pathway and the second pathway. In one or more embodiments, the risk management system considered a reduction of risk to both of these pathways in determining which action item would have the greatest impact on overall risk to the computing network.

Figure 4A:
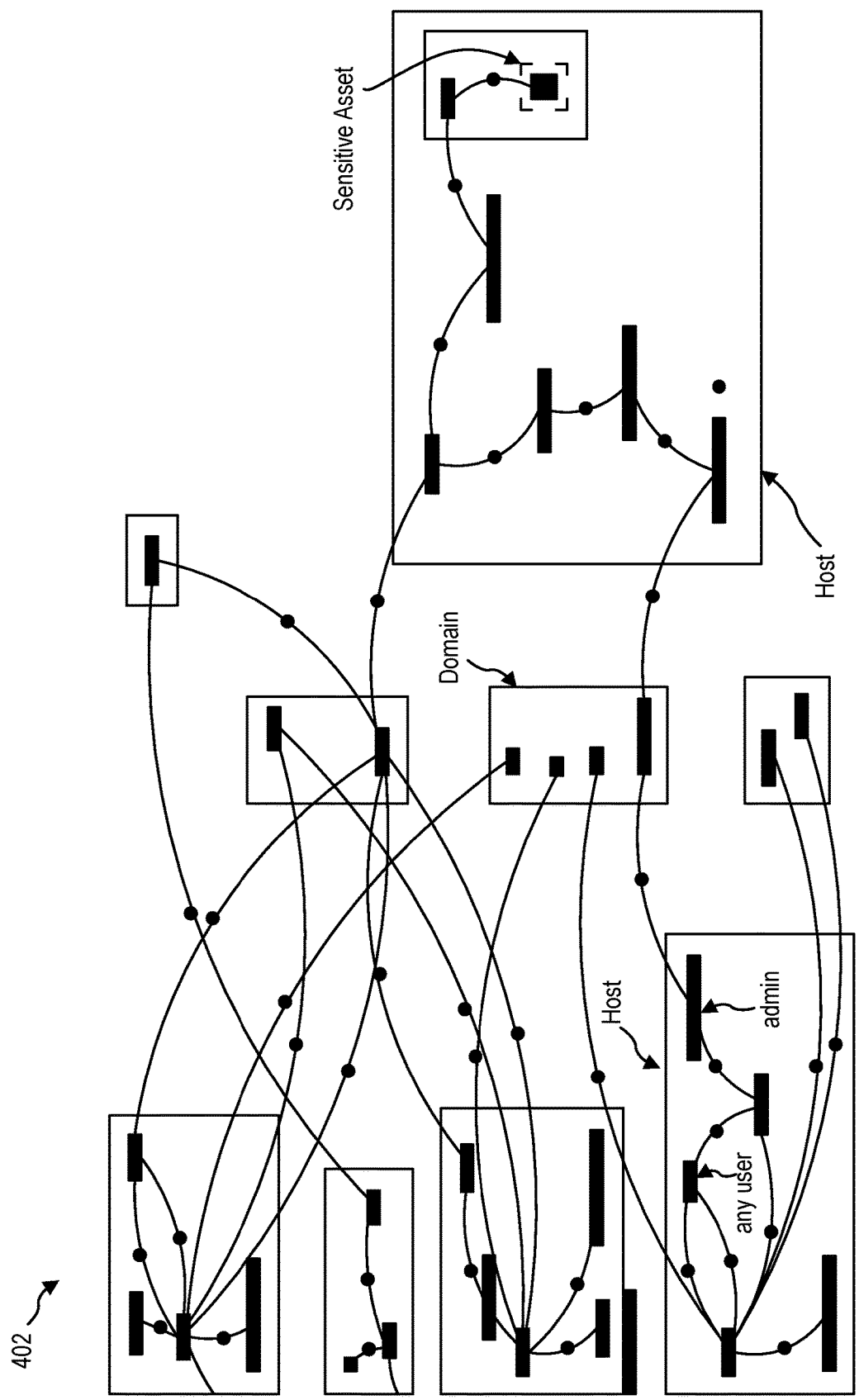
FIG. 4A illustrates another example graph showing network devices and nodes that make up network paths between attacking entities and an asset in accordance with one or more embodiments.

FIG. 4A illustrates another example computing network 402 including a plurality of nodes implemented on components of the computing network 402. As shown in FIG. 4A, the nodes may be interconnected by way of edges that form pathways between points of origin and a sensitive asset. Each of the edges, nodes, and devices of the computing network 402 may include similar features and functionality as discussed in one or more embodiments above.

In the example shown in FIG. 4A, a pathway may be identified between a point of origin (e.g., a point of entry to the network or an attacking entity) and a sensitive asset. The network pathway may traverse any number of edges via multiple nodes on one or multiple devices of the computing network. As shown in FIG. 4A, the nodes may be associated with any user, administrator, or group of users. As further shown, the different devices may be associated with a particular host (e.g., a host server), a domain, or any type of network device included within the computing network 402.

Figure 4B:
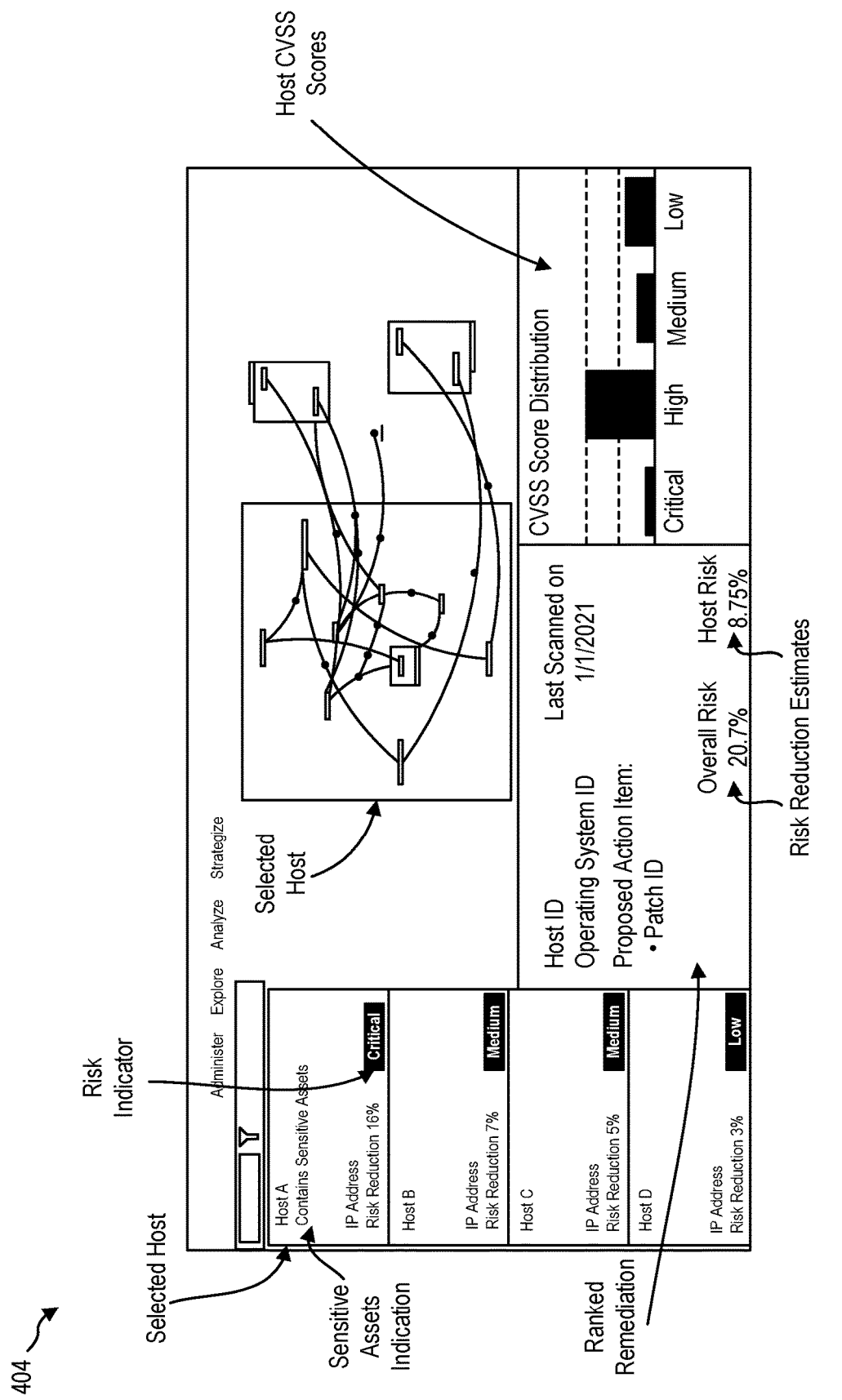
FIG. 4B shows an example risk report showing one or more action items that may be performed to reduce risk on one or multiple pathways of a generated graph in accordance with one or more embodiments.

FIG. 4B illustrates an example interface showing a report 404 that may be presented based on action items identified for reducing risk on a computing network. For example, as shown in FIG. 4B, the risk management system 104 may generate and present a report 404 including an indication of one or more action items that may be performed to remove escalations and/or vulnerabilities from the computing network. The report may include information about the escalations and sensitive assets such as a level of risk associated with the corresponding actions. The report 404 may further include specific actions that may be performed to reduce the risk. The report 404 may also include metrics of risk reduction, such as a total reduction of risk to the system. It will be understood that the risk report shown in FIG. 4B is provided by way of example and not limitation, and the report may include any information about the graph, including nodes, pathways, edges, and the estimated reduction of risk prior to and after performing one or more action items.

In accordance with one or more embodiments described above, vulnerability management teams rely on external threat feeds that do not have context regarding a specific security architecture, rely heavily on their gut or personal experience, or hire expensive analysts to manually review vulnerability reports and provide penetration testing. For example, penetration testing may simulate a variety of adversary attacks, but is time consuming, costly, identifies a select few attack paths to test exploits, and leads to infrequent evaluations (e.g., yearly).

One or more embodiments described herein use a rich set of contextual data to characterize a customer's specific security architecture. This permits a simulated adversary review of network vulnerabilities. The system uses a combination of knowledge of sensitive assets in a particular network, knowledge of the greater network security architecture, as well as knowledge of system access rights and application configurations, to generate a comprehensive threat model. The comprehensive threat model can be used to evaluate incoming vulnerability data, per a rule set, against the specific customer's security architecture. This provides an automated and contextual analysis of the risks that vulnerabilities pose to the specific customer's network. Further, the vulnerabilities may be contextualized in terms of priority scoring and remediation importance.

In one or more embodiments, systems described herein act as a force multiplier for CISOs by aligning vulnerability management activities with actual business risk. The system allows CISOs to navigate through vulnerability reports with confidence that actual, business-specific threats have been highlighted. In addition, the system permits the risk to be presented to the rest of the organization in an understandable way. This facilitates buy-in from decision makers that choose and implement remediations.

In order to provide a useful model that actually captures potential threats from a human adversary ("hacker"), the system generates a model that is based on a particular network environment, including the physical and logical network security architecture. The comprehensive threat model may include (a) the customer's security architecture and (b) vulnerability data, which is mapped to the model using (c) a set of rules. Customer-specific data and domain knowledge are obtained and used to form a comprehensive threat model that is specific to the customer's network and is used to analyze risks or threats based on updated vulnerability data and updated changes to the customer's security architecture.

The customer's security architecture is characterized by the collection of nodes in the customer's network that interact with one another. A feature of the customer's security architecture includes relating entities as nodes using access rights. This data permits a modeling of a customer security architecture, which when combined with the vulnerability data forms a comprehensive threat model. The data necessary to build a model of the customer security architecture, e.g., data logs, user behavior data, user account data, relationships between the user accounts, application configurations, etc., may be gathered from customer systems and databases, as well as from public sources. For example, a customer may indicate high priority assets, an agentless scan may be made to identify information in an automated way, e.g., identify interconnected network elements, systems, applications and devices, and automated queries may be used to obtain user account details (e.g., credentials), access policies, application configurations and the like. Additionally, knowledge of the systems, devices and applications used by the customer may be included, e.g., knowledge that certain Windows credential types have access to or control of certain other elements. This data is incorporated into a customer's security architecture model.

The customer security architecture may be formed into a graph. In the graph, nodes are represented (e.g., user accounts, domains, hosts, etc.) and are related to one another using edges (e.g., communicates with, can be accessed by, etc.). In the system, the nodes may be identified and related to vulnerability data, and edges formed and/or weighted by rules that relate the vulnerability data to the network. That is, the system provides rules that transform the vulnerability data, e.g., description of an exploit, into a data set that maps to the graph model, e.g., updates the weights of an edge connecting nodes relevant to the vulnerability data update.

Thus, the system, having access to the data needed to assess and model the customer security architecture, may combine this data with vulnerability data according to a rule set and represent it in a graph format for use as a comprehensive threat model for the customer. The comprehensive threat model may in turn be used for evaluation, e.g., determine the risk or analyze a threat and generally prioritize vulnerabilities and remediations.

By way of example, nodes (physical or logical entities, e.g., user account types, user accounts, access privileges, etc.) are associated with edges (e.g., access to, control of, etc.) and represented in a graph. As discussed herein, part of the customer security architecture may be represented in a graph format in which nodes (e.g., user accounts such as "any user," "admin," etc.) are represented, with relationships between the nodes represented by edges (which may be directional). In one or more embodiments, nodes may be associated with larger entities, e.g., a host, a domain, etc., may be considered a node. The entities or nodes may be modeled to reflect the actual networking environment from a security perspective, i.e., in view of the vulnerability data, using one or more rules. By way of example, for a networking environment in which different user account types are used as a security measure, a host entity may have different user account types associated therewith and represented separately in the model. By way of specific example, account types such as "any user" (standard user), "admin" (administrative user), etc., may be modeled to reflect the customer's actual choices (in terms of accounts created, application configurations, etc.) or potential choices (e.g., accounts possible given the software, etc.). Thus, the edges in the graph may reflect the access between the nodes per the actual network configuration.

These various nodes, e.g., accounts, have access privileges and permissions that are distinct and therefore the accounts can be related to different security risks, such as relation to a particular vulnerability by virtue of having different access and privileges within this specific network, e.g., through a domain. This not only contextualizes the customer's network in terms of connectivity and possible paths to a sensitive asset, but relates customer-specific contextual data (chosen/configured or potential) of the network environment and the incoming vulnerability data, as adapted by the one or more rules.

Vulnerability data is added to the customer security architecture to create a comprehensive threat model and facilitate additional analyses, e.g., attack pathfinding and vulnerability prioritization. The vulnerability data may be received, accessed, etc., from a standard source, e.g., a vulnerability repository that is updated frequently with the latest known security threats and remediations (e.g., patches). For example, the vulnerability data may be Common Vulnerabilities and Exposure (CVE®) data, i.e., a list of entries that contains an identification number, a description, and a reference for publicly known cybersecurity vulnerabilities.

Systems described herein may use one or more rules for a vulnerability to add or map vulnerabilities to the graphed customer security architecture to form the comprehensive threat model. The rules are used to add a vulnerability to the customer security architecture and weight the edges in the graph from a security perspective, e.g., based on difficulty of exploiting a vulnerability in a context. In one example, the customer security architecture is stored in a graph database, with nodes (e.g., user account) and edges (e.g., access rights to other nodes). The vulnerability data is matched to nodes in the graph using one or more rules. The matching or mapping may be one-to-one, many-to-one, one-to-many, or many-to-many, depending on the underlying network.

In one or more embodiments, vulnerability data, such as a CVE, is analyzed to create a rule by identifying one or more starting points of the vulnerability (e.g., adversary) and one or more end points for the vulnerability (e.g., user browsers that are affected by the vulnerability). This analysis may be automated, semi-automated, or manual. As a specific example, a vulnerability (e.g., exploit of ActiveX control) may be received and a rule may be created that associates nodes that have software susceptible to the attack via the vulnerability. That is, a host associated with software impacted by the vulnerability may be a target. The vulnerability is then associated with any level of access (represented as a node) within this host that could be compromised by exploiting the software. Furthermore, the vulnerability is associated with another node (e.g., an external adversary). If the vulnerability does not match any nodes, e.g., the network or host does not contain suitable or important starting or target nodes, the vulnerability (e.g., CVE update) may be disregarded and not added to the graph.

The edge, e.g., as established by rule in FIG. 3, may be weighted in a variety of ways. For example, the weight may be based on the one or more rules, e.g., a numeric value (weight) that represents the likelihood an attacker would choose a given vulnerability to exploit a possible attack path to a sensitive asset (an escalation) may be applied by rule. This value may be selected or determined in a variety of ways, e.g., based on vulnerability type. The one or more vulnerability scores or probabilities may be considered as a weight and used to provide a numeric value to the edge in terms of risk. Multiple scores or probabilities associated with escalations for an edge may be aggregated to form a combined weight for a given edge. This acts as a proxy for the relative risk posed to the network, given the vulnerability data, for the edge. Alternatives are possible. For example, it is possible to use the CVSS score or threat intelligence score as the weight (for the edge, not the overall vulnerability score). A specific example of weighting an edge is provided below in an example of forming an overall risk score.

Attributes that may be evaluated to weight an edge include, but are not limited to, user interaction (needed to make the exploit happen), disruption (e.g., unwanted side-effects that could alert a defender, such as crashing a machine), exploit development (e.g., difficulty involved with development of an exploit of this nature, such as executable code download), identification (how difficult it is to know if the vulnerability exists before trying to exploit it), certainty (the level of confidence that this vulnerability really exists in this context and is not a false positive), and completeness (the completeness of access granted to the target node, e.g. arbitrary code execution as the target vs only the ability to write arbitrary files to the system).

By way of specific example, for two incoming vulnerabilities that are both generically scored as high risk (e.g., CVSS is high), each may affect the customer's specific network in different ways. If each of the vulnerabilities, A and B, impact two different devices in the network, as identified in the customer's specific architecture, a further evaluation is needed to determine if the risks are both high risk to the customer. Consider an example where only one of these vulnerabilities may be a high risk for the specific customer, whereas the other may be relatively low risk. In order to make such a determination, the system uses an intelligent scoring system to evaluate each vulnerability in context.

In a specific, non-limiting example, a rule indicating that recent use is important may be used to distinguish between the two vulnerabilities in terms of scoring them for a specific network. For example, it may be known from the customer security architecture that a first device, having vulnerability A, is not frequently used, whereas a second device, having vulnerability B, is used frequently. Furthermore, each of the vulnerabilities may require user interaction, e.g., interaction with a web page, for the vulnerability to be realized. Therefore, a differential scoring is possible by applying a rule to assign relative score as it relates to this specific network environment. Thus, in a graph, although edges may be created or updated based on each of these vulnerabilities, the edge associated with a frequently used machine type may be weighted higher. Likewise, different vulnerabilities may be evaluated, distinguished, and contextually scored in other scenarios using the one or more rules. By way of specific, non-limiting example, if a first vulnerability is generically scored high risk (e.g., CVSS), but requires a customized exploit be built, it may be scored lower than a vulnerability with a generic risk score of moderate that uses an off the shelf (already created) exploit.

The one or more rules influence the edges by imparting a weight that reflects the likelihood of a successful exploitation of the vulnerability impacting an edge. In one example, a weighted edge represents an attack path or segment thereof. Each edge in a potential path, once assigned a weight, is aggregated along with the other edges to assign a likelihood score for the overall given path, which can then be prioritized and provided to a user. By way of example, the rules may include, but are not limited to, assignment of a weight to an edge based on difficulty (e.g., off the shelf exploit versus custom developed exploit) and user interaction (e.g., user required to interact with the exploit versus no interaction required). After weights have been assigned to edges within the graph, a most likely path between a source (e.g., adversary) and a destination (e.g., sensitive asset) can be identified along with less likely paths. These potential paths can be generated and sorted using a pathfinding process.

The path likelihoods can be determined in a variety of ways. In one example, edge probabilities for a path may be used to determine a likely path, but tempered by a complexity factor (e.g., number of hops in the graph between entry and target). The path likelihoods, once calculated, in turn may be used, e.g., in combination with an impact factor or multiple, for rankings, e.g., to prioritize the attack paths in terms of overall risk and remediation. In an example case, the path likelihood may be combined with an impact weight of factor, e.g., impact to the customer if a sensitive asset is reached, to provide an overall risk score for each path.

While certain useful applications can be made for prioritized paths, e.g., highlighting the same in a view or visualization for further analysis or confirmation of scoring, the nodes or edges themselves may be evaluated to rank them in terms of remediation. For example, an edge or its associated nodes may be highlighted for remediation based on a number or quality of path(s) that traverse through the node(s) or use the edge(s). By way of specific example, a high risk path (high scoring in terms of likelihood of the path's exploitation and impact if exploited) may be deprioritized in favor of remediating a node or edge that, while lower risk paths are associated with it, is capable of being utilized to complete many lower scored paths to a sensitive asset (i.e., eliminating the edge or node vulnerability removes many potential attack paths that cumulatively form a more likely attack vector for an adversary).

An edge or node in the graph may have more than one associated vulnerability. For example, a node may include software that has more than one vulnerability impacting its edge(s) with another node. Therefore, the system determines an overall score for the entity, node or edge given the multiple vulnerabilities. Further, the system may determine a priority for vulnerabilities in such a scenario, e.g., a priority list. For example, the system may initially prioritize an edge as high risk and thereafter prioritize the vulnerabilities associated with the edge, e.g., based on the contribution to the overall risk to the system, overall risk to a particular asset, etc.

As may be appreciated from the foregoing, selection of a remediation option is possible by calculating from the graph the vulnerability with the greatest risk, the vulnerability that will have the greatest system wide risk reduction value, the vulnerability that will reduce a priority edge's risk the most, etc. The system may be configured to choose a different vulnerability to highlight for remediation based on a variety of factors, e.g., overall risk reduction, host risk reduction, cost, simplicity, time required, machines or users impacted, etc.

The system therefore may prioritize vulnerabilities based on the specific network environment, i.e., represented by the customer security architecture as incorporated into the comprehensive threat model. This allows a user, e.g., that is charged with implementing remediations, to prioritize tasks irrespective of the generic CVSS score for the vulnerability. For example, using the system a user is able to determine that a high CVSS score is less worrisome in the context of the user's particular network, e.g., because the network architecture dictates that the vulnerability is not located on a viable attack path leading to a sensitive asset.

Figure 5:
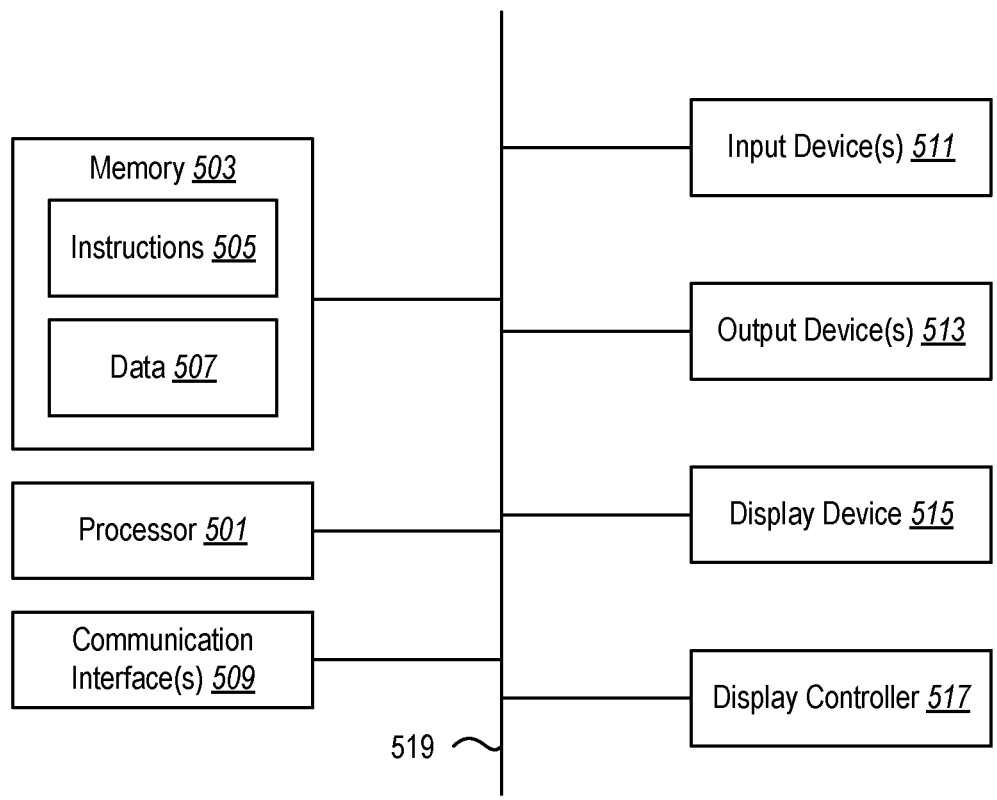
FIG. 5 shows a series of acts that may be performed in connection with diagnosing asset risk and determining action items to minimize risk in accordance with one or more embodiments.

The system may provide visualizations or other data outputs that assist the user in understanding the comprehensive threat assessment. For example, shown in FIG. 5 is a filtered view (part of a larger network) of a comprehensive threat model for a specific customer network that includes scored risk paths. The user may interact with the view, e.g., select an edge or node, to identify the vulnerabilities associated with the element as well as notes regarding why it has been scored as displayed. The scores may be indicated in a variety of ways, e.g., numerically, with color coding, etc.

In one or more embodiments, if a user selects or indicates a given edge, the details about the edge with respect to vulnerabilities and risk associated therewith, in the context of the specific network, are displayed. For example, a user may select an edge between a node representing access to a subnet and a host containing a sensitive asset, and the system displays to the user the associated vulnerabilities along with the reasoning behind the scoring of the edge, i.e., its inclusion in many possible attack paths, as well as specific examples of possible attack paths or segments thereof.

In one or more embodiments, the edge selected provides access from an unprivileged node to a local system node. Here it can be appreciated that the edge ca be weighted yellow (or other color) or moderate in terms of its risk. It is noted in the selected edge score area that the score may be, e.g., 57.59%, indicating that the edge has this or greater percent risk as compared to other edges. In an edge score reasoning section is displayed data explaining that this edge is part of some number of potential attack paths (e.g., 73). Further, the edge score reasoning section indicates a prioritized listing of paths for the user's consideration.

In one or more embodiments, a system accesses a variety of data (data indicating sensitive assets, data indicating network architecture, data indicating system access rights, data indicating application configuration, and vulnerability data) in order to form a customer-specific comprehensive threat model (e.g., a directed graph). In an example, the data is used to identify hosts and associate the hosts with the vulnerability data such that host-level views for risk may be presented.

In one or more embodiments, the system may provide one or more reports including a prioritized listing of hosts that the system has determined have the greatest risk based on the current vulnerability data based on the comprehensive threat model. An example is shown in FIG. 4B. In that example, a user may select a host, which contains an indication (critical in this case) of risk associated with the host. The selected host is also indicated as having sensitive assets contained therein, with the actual file location of the sensitive assets being displayed in the lower right hand panel. This data may be discovered and stored during an initial scanning process and later retrieved in association with identifying the host as storing an important asset in terms of business risk. The selected host is displayed in the center in a graph view where it can be viewed in context. The system may display the graph view with more or less granularity in the network based on the underlying graph data, which is user selectable (e.g., via a slider), but is initially set to a default granularity centered on the host in question.

In one or more embodiments, the report shows that the vulnerability remediations (Windows patches in this example) are listed along with a calculation of overall and host level risk reduction that would be achieved if the patches were applied. Again, such calculations are possible by applying the remediation(s) to the graph model and recalculating the overall (network) or host level risk scores, as explained above.

In contrast with standard or conventional systems, which simply match the incoming vulnerability data to a specific device (and perhaps present this information in a network view or graphic), the system utilizes rules to intelligently locate associations between network entities and present this with the vulnerability data mapped to the customer's security architecture with specific contextual risk scoring.

By way of specific example, incoming vulnerability data may indicate a specific vulnerability that, when interacted with (e.g., by navigating to a web page and clicking on a link), can cause code to be downloaded and executed by a vulnerable application. The proposed remediation is to update the vulnerable application. In such a situation, typically a vulnerability scanner would identify the device(s), if any, in a network that are affected, i.e., have a copy of the vulnerable application in a version that is not updated or patched, such that the vulnerability applies. This may result in a large list of devices or at best a network graphic illustrating the location of the devices having the vulnerable software. When combined with other vulnerabilities, similarly detected in the network, the list of devices may grow and the complexity of any graphic increases greatly. Further, in a typical vulnerability management solution, there is nothing to indicate the importance or risk of any specific device to the context of the customer's network other than the generic rating that accompanies the vulnerability data (e.g., CVE score (CVSS)), which may not even apply to the customer's network. While a user may manually review this data and make decisions, this is time consuming and complex.

The comprehensive threat model available to the system is valuable in that it permits not only the vulnerability to be mapped to entities within the network, e.g., hosts, but also allows for context specific evaluation of the vulnerabilities, e.g., taking into account the contextualized entities, their relationships to one another, and the likelihood that an adversary would exploit the vulnerability and have an impact, e.g., according to one or more rules for weighting or scoring edges, paths, and calculating overall risk.

One or more scenario analyses may be used to intelligently prioritize the vulnerabilities. In this process, an entry point in the graph representation of the customer security architecture, e.g., an adversary, and an endpoint, e.g., a sensitive asset, are selected to establish possible path(s) through a graph structure that represent possible attack vectors. In a scenario, a path may be evaluated according to likelihood and overall risk. This may include scoring the path in terms of likelihood using the weighted edges, and scoring the path in terms of overall risk by taking into account the impact of the exploit if successful. The scoring may take into account the complexity of the path (e.g., number of hops in the graph between entry and target), its length (e.g., the shorter the length is, the higher the risk is evaluated), and/or the impact factor of the sensitive asset at the end of the path. By evaluating various scenarios, the system can present the most likely paths, i.e., those representing the paths most likely to be exploited in the customer's network. Further, scenarios may be evaluated to prioritize and rank paths in terms of overall risk, i.e., taking into account path likelihood and impact to the customer's network. Finally, scenarios may be used to identify the node(s) or edge(s) having the most impact in terms of remediation.

In one or more embodiments, a variety of visual displays may be provided to assist the user with understanding and acting on the risk scoring provided by the system. For example, the systems may provide a view that illustrates to a user the amount of risk reduction possible from resolving risks that have been identified and scored for particular hosts within an environment. The view may show a listing of different hosts, sorted according to risk categorization. The view may also show a graphic that displays information indicating, for each host in the list, how much risk reduction will be achieved by resolving the vulnerabilities associated with that host. This permits a user to quickly understand which hosts are having the biggest impact on network risk. Such a view may be used to identify hosts that should be patched, remediated or retired from the network.

As described, the system utilizes a comprehensive threat model that is customized to a customer's specific network environment. Given this, it is possible to evaluate the comprehensive threat model from a variety of different perspectives. In one or more embodiments, different views of pertinent data may be retrieved and displayed by evaluating the comprehensive threat model. For example, it is possible to calculate the priority patches, hosts, and vulnerabilities, e.g., by listing or displaying those with the highest scores according to evaluation of the comprehensive threat model. Likewise, time series analyses and data may be displayed, such as the timeline of network risk displayed in a portion of the view(s). This provides quick understanding of the network risk analysis and possible remediation actions such that this data can be communicated to various stakeholders and decision makers.

As may be appreciated from one or more embodiments described herein, various layers or levels of information may be provided based on the context. By way of example, one or more views may be provided to users that require a high level overview of network health and suggested remediations. The views may be provided to those same users or to more technical users that wish to understand why certain vulnerabilities are being highlighted, why certain risk scores are being displayed, as well as some context of why particular systems, hosts, vulnerabilities or remediations are highlighted. The view(s) may be provided to technical users that wish to have a detailed or technical understanding of the network context and potential attack paths that lead to the results.

An additional innovation includes a tool for identifying Windows local privilege escalation vulnerabilities. The presence of such vulnerabilities are very common on Windows where services are configured to run executables from directories with weak filesystem permissions. Using such configurations opens up possible vulnerabilities that are not typically detected. In one example, user account(s) that may potentially exploit these privilege issues are identified along with what access level the user account(s) might obtain in doing so. This may include identifying specific vulnerability types, such as unquoted service path vulnerabilities (allowing insertion of an executable into a privileged service), DLL sideloading vulnerabilities (insertion of malicious file into dynamic link library (DLL) directory), or EXE permissions problems (e.g., weak permission vulnerabilities). The tool would provide these detected configuration vulnerabilities as potential vulnerabilities and may incorporate the same into a graph analysis, similar to other vulnerability data. That is, these Windows local privilege escalation vulnerabilities may be incorporated into the graph analysis along with the vulnerability data discussed above.

An additional innovation relates to a crowd sourced remediation tool that provides cost estimates for implementing remediation suggestions made by the system. This may be valuable in that it is not always apparent what impact a remediation step will have on the system, e.g., system downtime. Therefore, a tool would permit users to access a remediation suggestion that is linked to a context, e.g., context of the system architecture, and permit the users to understand how others have rated or ranked this remediation in context. For example, other users may have dealt with a similar remediation step in the past and deployed it in a similar network context. Thus, those users may be provided with an interface for providing feedback on a potential remediation, alone or in a specific context. The crowd sourced feedback may be provided to a user faced with deciding between seemingly equivalent remediations steps to resolve which is best based on a cost estimate. By way of example, a user may be provided with remediations that are ranked automatically by the system according to their crowd sourced cost estimates. Additional or alternative options may be provided, e.g., ranking the remediations by the system according to a weighted scoring system that takes into account the overall vulnerability remediation (e.g., risk reduction) and cost (e.g., crowd source cost estimate). In cases where a vulnerability has no crowd source cost estimate in context, a default crowd sourced cost estimate may be used (e.g., average of the cost across different network architecture or context types). Such a tool will assist users in understanding the potential downside of performing a particular remediation activity, including the effort to apply the fix as well as the risk of potential disruption the fix might cause.

Many of the features and functionalities described herein are described in connection with specific examples or embodiments. It will be understood that different features and acts described in connection with a specific example or implementation may apply to other examples or implementations. Moreover, it will be understood that alternative implementations may omit, add to, reorder, and/or modify any of the acts or series of acts described herein. In addition, the risk management system 104 may perform acts described herein as part of a method, Alternatively, the risk management system 104 may implement a non-transitory computer readable medium including instructions that, when executed by one or more processors, cause a computing device (e.g., a server device) to perform features and functionality described herein. In still further embodiments, a system can perform the features and functionality described herein.

In accordance with one aspect of the present disclosure, a method is disclosed that includes receiving network information associated with a computing network, the network information including asset data, network architecture data, access rights data, and application configuration data. The method may further include identifying a plurality of vulnerability instances for the computing network. The method may also include generating a threat graph for the computing network based on the network information and the plurality of vulnerability instances, the threat graph including a plurality of pathways between an attacking entity and one or more sensitive assets on the computing network, each pathway of the plurality of pathways including one or more edges between access nodes of the computing network, wherein the access nodes indicate levels of access on the computing network. The method may also include determining, for each pathway of the plurality of pathways, a pathway risk based on a risk associated with each edge from the one or more edges. The method may also include identifying a security action item to perform on at least one vulnerability instance from the plurality of vulnerability instances based on an associated reduction of risk to the computing network.

In one or more embodiments, the asset data includes an identification of one or more assets on the computing network as a sensitive asset. In one or more embodiments, the network architecture data includes connectivity data between nodes and devices of the computing network with other nodes and devices of the computing network. In one or more embodiments, the access rights data indicates levels of privilege associated with the access nodes of the computing network. In one or more embodiments, the application configuration data indicates settings and preferences for applications running on devices of the network information data.

In one or more embodiments, identifying a plurality of vulnerability includes running a vulnerability scan on the computing network to identify instances of known vulnerabilities from a collection of known vulnerabilities. In one or more embodiments, generating the threat graph includes applying a rules engine to the network information to identify a set of access nodes and edges, the edges being associated with at least one vulnerability instance from the plurality of vulnerability instances. In one or more embodiments, the rules engine is trained to identify the set of access nodes and associated edges based on associated likelihoods that an attacker would choose the edges to exploit in gaining access to a sensitive asset. In one or more embodiments, the network information further includes historical usage data associated with use of one or more applications and devices on the computing network, wherein generating the threat graph including is based at least in part on the historical usage data associated with use of the one or more applications and devices on the computing network.

In one or more embodiments, the method includes determining, for each edge from the threat graph, an associated edge risk based on one or multiple vulnerability instances that are applicable to the edge. In one or more embodiments, generating the threat graph includes identifying a set of pathways including a subset of pathways from a collection of pathways between the attacking entity and the one or more sensitive assets, the subset of pathways being associated with higher likelihoods that an attacker would choose the subset of possible pathways over other pathways from the collection of pathways.

In one or more embodiments, the plurality of pathways includes a first pathway including a first set of one or more edges the define a network path between the attacking entity and a first sensitive asset. The plurality of pathways may further include a second pathway including a second set of one or more edges that define a network path between the attacking entity and a second sensitive asset. In one or more embodiments, the first pathway and the second pathway include at least one edge from the first set of one or more edges and the second set of one or more edges in common. In one or more embodiments, the first pathway includes a first pathway risk based on a first likelihood that an attacker would choose the first pathway to access the first sensitive asset, wherein the first likelihood is based at least in part on risks associated with a first set of vulnerability instances applicable to the first set of one or more edges. In one or more embodiments, second pathway includes a second pathway risk based on a second likelihood that the attacker would choose the second pathway to access the second sensitive asset, wherein the second likelihood is based at least in part on risks associated with a second set of vulnerability instances applicable to the second set of one or more edges.

In one or more embodiments, the pathway risk is based on a combination of likelihoods associated with each edge on the pathway and an impact associated with an attacker accessing a sensitive asset corresponding to the pathway. In one or more embodiments, identifying the security action item includes identifying a first action item from a plurality of action items associated with a largest amount of risk reduction on the computing network. In one or more embodiments, the plurality of action items includes a collection of predefined action items that may be performed on the computing network to remove one or more vulnerability instances from the plurality of vulnerability instances.

In one or more embodiments, the plurality of action items includes one or more of a first action of removing all instances of a first vulnerability from the identified plurality of vulnerabilities, a second action of removing some or all vulnerabilities from an associated edge within the threat graph, a third action of applying a software patch to each of one or more devices on the computing network associated with a vulnerability that is removed by applying the software patch, or a fourth action of removing some or all vulnerabilities associated with a first device on the computing network. In one or more embodiments, the plurality of action items includes two or more of the first action, the second action, the third action, and the fourth action.

In one or more embodiments, the computing network includes one or more of a local computing network, a public computing network, a private computing network, or a portion of a cloud computing network. In one or more embodiments, the access nodes are located on a plurality of different types of computing devices that make up the computing network. In one or more embodiments, the attacking entity includes one or more of an external attacking entity originating from outside the computing network or an internal attacking entity originating from a device within the computing network.

In one or more embodiments, a system is disclosed including at least one processor, memory in electronic communication with the at least one processor an instructions stored in memory that cause the processor(s) to perform acts described herein. For example, the instructions can cause the processor/system to perform any of the acts of the method(s) described above. In one or more embodiments, a non-transitory computer readable medium is disclosed including instructions thereon that, when executed by at least one processor, cause a computing device(s) to perform acts described herein (e.g., the method(s) described above).

FIG. 5 illustrates certain components that may be included within a computer system 500. One or more computer systems 500 may be used to implement the various devices, components, and systems described herein.

The computer system 500 includes a processor 501. The processor 501 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
receiving network information associated with a computing network;
identifying a plurality of vulnerability instances for the computing network;
generating, with a processor, a threat graph for the computing network based on the network information and the plurality of vulnerability instances, the threat graph including a plurality of pathways between an attacking entity and one or more sensitive assets on the computing network, each pathway of the plurality of pathways including one or more edges between access nodes of the computing network, wherein the access nodes indicate levels of access on the computing network, wherein each pathway of the plurality of pathways includes a likelihood of attack along the pathway, the likelihood of attack indicating a likelihood that a corresponding edge will be used by an attacker to gain access to the one or more sensitive assets;
determining, for each of the plurality of pathways, a pathway risk based on a risk associated with each edge from the one or more edges, the pathway risk being determined based on an associated likelihood of attack for the edge and an impact of an associated asset for a corresponding pathway; and
identifying a security action item to perform on at least one vulnerability instance from the plurality of vulnerability instances based on an associated reduction of risk to the computing network as a result of performing the security action item.

2. The method of claim 1, wherein the network information includes one or more of:
asset data including an identification of one or more assets on the computing network as a sensitive asset;
network architecture data including connectivity data between nodes and devices of the computing network with other nodes and devices of the computing network;
access rights data indicating levels of privilege associated with the access nodes of the computing network; and
application configuration data indicating settings and preferences for applications running on devices of the network information data.

3. The method of claim 1, wherein identifying a plurality of vulnerability instances includes running a vulnerability scan on the computing network to identify instances of known vulnerabilities from a collection of known vulnerabilities.

4. The method of claim 1, wherein generating the threat graph includes applying rules to the network information to identify a set of access nodes and associated edges, each of the associated edges being associated with at least one vulnerability instance from the plurality of vulnerability instances.

5. The method of claim 4, wherein the rules identify the set of access nodes and associated edges based on associated likelihoods that an attacker would choose the edges to exploit in gaining access to a sensitive asset.

6. The method of claim 1, further comprising determining, for each edge from the threat graph, an associated edge risk based on one or multiple vulnerability instances that are applicable to the edge, wherein the pathway risk is based on a combination of edge risks for each edge from the associated pathway.

7. The method of claim 1, wherein generating the threat graph includes identifying a subset of pathways from a collection of pathways between the attacking entity and the one or more sensitive assets, the subset of pathways being associated with higher likelihoods of attacker exploit.

8. The method of claim 1, wherein the plurality of pathways include:
a first pathway including a first set of one or more edges that define a network path between the attacking entity and a first sensitive asset;
a second pathway including a second set of one or more edges that define a network path between the attacking entity and a second sensitive asset.

9. The method of claim 8, wherein the first pathway and the second pathway include at least one edge in common.

10. The method of claim 9,
wherein the first pathway includes a first pathway risk based on a first likelihood that an attacker would choose the first pathway to access the first sensitive asset, wherein the first likelihood is based at least in part on risks associated with a first set of vulnerability instances applicable to the first set of one or more edges, and
wherein the second pathway includes a second pathway risk based on a second likelihood that the attacker would choose the second pathway to access the second sensitive asset, wherein the second likelihood is based at least in part on risks associated with a second set of vulnerability instances applicable to the second set of one or more edges.

11. The method of claim 1, wherein identifying the security action item includes identifying a first action item from a plurality of action items associated with a largest amount of risk reduction on the computing network relative to other security action items from the plurality of action items, the largest amount of risk reduction being based on a reduction in the pathway risk as a result of performing an action of the security action item relative to reduction in pathway risks as a result of performing actions of the other security action items.

12. The method of claim 11, wherein the plurality of action items includes a collection of predefined action items that may be performed on the computing network to remove one or more vulnerability instances from the plurality of vulnerability instances.

13. The method of claim 11, wherein the plurality of action items includes one or more of:
a first action of removing all instances of a first vulnerability from the identified plurality of vulnerabilities;
a second action of removing some or all vulnerabilities from an edge within the threat graph;
a third action of applying a software patch to each of one or more devices on the computing network associated with a vulnerability; or
a fourth action of removing some or all vulnerabilities associated with a first device on the computing network.

14. The method of claim 13, wherein the plurality of action items includes two or more of the first action, the second action, the third action, and the fourth action.

15. The method of claim 1, wherein the computing network includes one or more of:
a local computing network;
a public computing network;
a private computing network; or
a portion of a cloud computing network.

16. The method of claim 1, wherein the attacking entity includes one or more of an external attacking entity originating from outside the computing network or an internal attacking entity originating from a device within the computing network.

17. A system, comprising:
at least one processor; and
memory in electronic communication with the at least one processor; and
instructions stored in the memory that, when executed by the at least one processor, cause the system to:
receive network information associated with a computing network;
identify a plurality of vulnerability instances for the computing network;
generate a threat graph for the computing network based on the network information and the plurality of vulnerability instances, the threat graph including a plurality of pathways between an attacking entity and one or more sensitive assets on the computing network, each pathway of the plurality of pathways including one or more edges between access nodes of the computing network, wherein the access nodes indicate levels of access on the computing network, wherein each pathway of the plurality of pathways includes a likelihood of attack along the pathway, the likelihood of attack indicating a likelihood that a corresponding edge will be used by an attacker to gain access to the one or more sensitive assets;
determine, for each of the plurality of pathways, a pathway risk based on a risk associated with each edge from the one or more edges, the pathway risk being determined based on an associated likelihood of attack for the edge and an impact of an associated asset for a corresponding pathway; and
identify a security action item to perform on at least one vulnerability instance from the plurality of vulnerability instances based on an associated reduction of risk to the computing network as a result of performing the security action item.

18. The system of claim 17,
wherein generating the threat graph includes applying rules to the network information to identify a set of access nodes and edges, each of the edges being associated with at least one vulnerability instance from the plurality of vulnerability instances, and
wherein the rules identify the set of access nodes and associated edges based on associated likelihoods of attacker exploit in gaining access to a sensitive asset.

19. The system of claim 17, wherein generating the threat graph includes identifying a subset of pathways from a collection of pathways between the attacking entity and the one or more sensitive assets, the subset of pathways being associated with higher likelihoods of attacker exploit on the subset of possible pathways over other pathways from the collection of pathways, and wherein the method further comprises determining, for each edge from the subset of pathways, an associated edge risk based on one or multiple vulnerability instances that are applicable to the edge, wherein the pathway risk is based on a combination of edge risks for each edge from the associated pathway.

20. The system of claim 17, wherein identifying the security action item includes identifying a first action item from a plurality of action items associated with a largest amount of risk reduction on the computing network relative to other security action items from the plurality of action items, and wherein the plurality of action items includes two or more of:
a first action of removing all instances of a first vulnerability from the identified plurality of vulnerabilities;
a second action of removing some or all vulnerabilities from an associated edge within the threat graph;
a third action of applying a software patch to each of one or more devices on the computing network associated with a vulnerability that is removed by applying the software patch; and
a fourth action of removing some or all vulnerabilities associated with a first device on the computing network.

* * * * *